(12) United States Patent
Turkovic et al.

(10) Patent No.: US 12,556,445 B2
(45) Date of Patent: Feb. 17, 2026

(54) CLIENT DEVICE-ASSISTED APPLICATION CONTEXT TRANSFER

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Belma Turkovic, Delft (NL); Jarmo Theodore Wilkens, Málaga (ES); Lucia D'Acunto, Amsterdam (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 18/719,763

(22) PCT Filed: Dec. 16, 2022

(86) PCT No.: PCT/EP2022/086264
§ 371 (c)(1),
(2) Date: Jun. 13, 2024

(87) PCT Pub. No.: WO2023/117726
PCT Pub. Date: Jun. 29, 2023

(65) Prior Publication Data
US 2025/0047558 A1    Feb. 6, 2025

(30) Foreign Application Priority Data
Dec. 20, 2021  (EP) .................................. 21216081

(51) Int. Cl.
G06F 15/16 (2006.01)
H04L 41/0806 (2022.01)
H04L 67/60 (2022.01)

(52) U.S. Cl.
CPC .......... H04L 41/0806 (2013.01); H04L 67/60 (2022.05)

(58) Field of Classification Search
CPC ... H04L 41/0806; H04L 67/60; H04L 67/561; H04L 67/34; H04W 36/0033
See application file for complete search history.

(56) References Cited

U.S. PATENT DOCUMENTS 10,499,304 B1 * 12/2019 Stauffer .......... H04W 36/00835
2021/0337043 A1   10/2021 Hall et al.
2024/0147312 A1 *  5/2024 Hu .......................... H04W 8/20

FOREIGN PATENT DOCUMENTS

WO    2021204510 A1    4/2020

OTHER PUBLICATIONS

Huawei, H., "Application Context Relocation With Connection Re-establishment", 3GPP Draft; S6-200511, Mar. 25, 2020, 3rd Generation Partnership Project (3GPP), Mobile Competence Centre, 650, route des Lucioles, F-06921 Sophia- Antipolis Cedex, France.

(Continued)

Primary Examiner — John B Walsh
(74) Attorney, Agent, or Firm — Hamilton, Brook, Smith & Reynolds, P.C.

(57) ABSTRACT

A client device may utilize an application service provided by a mobile network. The client device may be configured to transfer an application context of the application service between different mobile networks by, when the client device is connected to a first mobile network, retrieving the application context from the first mobile network and storing the application context as a local copy in the data storage, and when the client device is connected to a second mobile network, sending the application context to the second mobile network. This way, it may not be needed to rely on connectivity existing between the first mobile network and (Continued)

the second mobile network to transfer the application context, which connectivity may for example lack if one or both of the mobile networks are non-public networks.

10 Claims, 12 Drawing Sheets

(56) References Cited

OTHER PUBLICATIONS

3GPP TS 23.558 V1.1.0, Technical Specification, 3rd Generation Partnership Project; technical Specification Group Services and System Aspects, Architecture for Enabling Edge Applications; (Release 17) (Oct. 2010).
ETSI White Paper No. 28-MEC in 5G Networks, First edition—Jun. 2018, ISBN No. 979-10-92620-22-1.
International Search Report and Written Opinion for PCT/EP2022/086264, dated Mar. 29, 2023.
European Search Report for EP 21216081.6, dated Jun. 28, 2022.

* cited by examiner

CLIENT DEVICE-ASSISTED APPLICATION CONTEXT TRANSFER

This application is the U.S. National Stage of International Application No. PCT/EP2022/086264, filed Dec. 16, 2022, which designates the U.S., published in English, and claims priority under 35 U.S.C. § 119 or 365(c) to European Application No. 21216081.6, filed Dec. 20, 2021. The entire teachings of the above applications are incorporated herein by reference.

TECHNICAL FIELD

The invention relates to a client device configured to utilize an application service provided by an application server in a data network of a mobile network, and to a computer-implemented method for use with such a client device. The invention further relates to a computer-readable medium comprising data representing instructions to cause a processor system to perform the method.

BACKGROUND

Multi-access Edge Computing (MEC) [1], or in short edge computing, is a computing paradigm where compute nodes may be located relatively close to a client device, for example at an edge of a mobile network. Such compute nodes may therefore also be referred to as edge nodes or simply as edges, and their location may enable higher-bandwidth, lower-latency, and/or higher-reliability connectivity to client devices. Edge computing is often seen as an enabler for applications with high computing and bandwidth resource remands, including real-time data processing for autonomous driving and high definition extended reality streaming applications.

In such edge computing, an edge application server may be instantiated on one or a distributed system of edge nodes and may provide an edge application service for utilization by the client device. Such an edge application service may for example process application data generated by the client device, such as captured sensor data, or process data received from other entities for use by the client device.

In many use cases involving edge computing, it may be desired or even required to have service continuity, referring to a client device being able to utilize such edge application services without or with minimal interruptions whenever and wherever the client device is. This may for example apply to mission-critical services, for example for use with remotely operated or self-driving vehicles, drones, or other machines, for example of the police, fire department or hospital. For example, a client device integrated into an ambulance may at an ambulance station have connectivity to a first mobile network and may be able to utilize an edge application service provided by the first mobile network, e.g., providing remote medical diagnostic and analytics services. However, while driving to or arriving at an incident location, the client device may find itself in better coverage of a second mobile network. To ensure service continuity, the client device may need to experience no or only minimal interruptions in the edge application service when switching mobile networks. This may require the edge application service to be relocated from the first to the second mobile network and the edge application service being seamlessly resumed from the second mobile network.

The need for seamless resumption of edge application services has been recognized. For example, 3GPP TS 23.558 [2] describes in section 8.8 a so-called Application Context Transfer (ACT) procedure which allows the application context of an edge application service to be transferred between edge application servers. Such an application context is defined by [2] as a set of data about and/or from the application client that resides in the edge application server. The transfer of such an application context may be a prerequisite for having service continuity when seeking to resume an edge application service from an edge application server in a second mobile network. However, the ACT procedure of [2] pertains only to the transfer of the application context between edge application servers of a same mobile network, e.g., a same Public Land Mobile Network (PLMN), and is thus rather applicable to the switching between edge application servers within a mobile network, for example when the client device moves between cells of the mobile network which are serviced by different edge application servers, and not to the switching between different mobile networks.

There is thus a need to be able to transfer the application context between different mobile networks. Such mobile networks may typically include public mobile networks, e.g., the aforementioned PLMNs, but also private networks, referring to Non-Public Networks (NPN) such as Standalone Non-Public Networks (SNPN) or Public Network Integrated Non-Public Network (PNI-NPNs). It may be desired for the client device to also seamlessly switch between such public and private networks alike, for example for client devices used for Public Protection and Disaster Relief (PPDR). However, a challenge with NPNs may be that there may only be limited or intermittent or even no connectivity between the mobile networks between which the client device may switch, such as the aforementioned first and second mobile networks.

There may thus be a need to be able to transfer the application context between mobile networks, including between public and private mobile networks and between private mobile networks. While the above refers to the application context of edge application services provided by edge application servers, such a need similarly exists for transfer of an application context of an application service which is provided by application server in a non-edge data network connected to the mobile network, with the term 'non-edge data network' referring to a data network which is further way from the client device than the edge.

REFERENCES

[1] ETSI White Paper No. 28—MEC in 5G networks; First edition—June 2018, ISBN No. 979-10-92620-22-1.

[2] 3GPP TS 23.558 V1.1.0 (October 2020), Technical Specification, 3rd Generation Partnership Project; Technical Specification Group Services and System Aspects; Architecture for enabling Edge Applications; (Release 17)

SUMMARY

In a first aspect of the invention, a client device for a mobile network is provided. The client device may comprise:
  a radio interface to connect to a first mobile network;
  a data storage to store data;
  a processor subsystem which may be configured to utilize an application service provided by a first application server, wherein the first application server may be located in a data network connected to the first mobile network;

wherein the processor subsystem may be configured to transfer an application context of the application service between different mobile networks by:

when the client device is connected via the radio interface to the first mobile network, retrieving the application context of the application service from the first mobile network and storing the application context as a local copy in the data storage; and when the client device is connected via the radio interface to a second mobile network, sending the application context to a second application server located in a data network connected to the second mobile network, which second application server is to provide the application service to the client device.

In a further aspect of the invention, a computer-implemented method may be provided for use with a client device. The client device may be configured to connect to a first mobile network and to utilize an application service provided by a first application server. The first application server may be located in a data network connected to the first mobile network. The method may comprise transferring an application context of the application service between different mobile networks by:

when the client device is connected to the first mobile network, retrieving the application context of the application service from the first mobile network and storing the application context as a local copy in a data storage of the client device; and when the client device is connected to a second mobile network, sending the application context to a second application server located in a data network connected to the second mobile network, which second application server is to provide the application service to the client device.

In a further aspect of the invention, a transitory or non-transitory computer-readable medium may be provided comprising data representing a computer program. The computer program may comprise instructions for causing a processor system to perform any given computer-implemented method described in this specification.

The above measures may involve a client device which may be capable of mobile connectivity, referring to the ability to connect a mobile network. The client device may therefore also be considered to represent a User Equipment (UE) of the mobile network. For providing the mobile connectivity, the client device may comprise a radio interface. Here, the term 'radio' be short for radio communication, with the radio interface being for example a hardware radio communication interface (e.g., based on mixers, filters, amplifiers, modulators/demodulators, detectors, antennas) or a software radio communication interface (also referred to as software-defined radio) or a combination of both types of radio interfaces. An example of a radio interface is a 5G or later generation radio interface for a 5G or later generation mobile network.

The client device may be configured to make use of an application service provided via a mobile network. A non-limiting example of such an application service is an application service located at an edge of the mobile network, with such an application service also being referred to as an edge application service. For example, the edge application service may be provided by an edge application server which may be instantiated on network node(s) in an edge data network connected to the mobile network. With continued reference to both edge and non-edge application services, the client device may be configured to utilize the application service provided by the application server. For that purpose, the client device may be configured with an application client which may make use of the application service, e.g., for example using an application programming interface (API). It is noted that such utilization of application services by a client device, for example in form of edge computing, is known per se and also introduced in the background section of this specification.

The application server may generate and maintain an application context of the application service. As also indicated in the background section, it may be desirable to be able to transfer the application context between mobile networks, including between public and private mobile networks and between private mobile networks. The following discusses such transfer with reference to a first mobile network (which may also be referred to as a 'source mobile network'), to which the client device may be connected at any given time and utilize an application service, and to a second mobile network (which may also be referred to as a 'target mobile network'), to which the client device may be connected at a later point in time, e.g., after losing mobile connectivity to the first mobile network or due to a change in the client device's service requirements or due to the source network not being able (anymore) to fulfil the initially agreed service requirements. It will be appreciated that while the following discusses certain functionality of the client device with respect to the first mobile network and other functionality with respect to the second mobile network, the client device may comprise such functionality in general with respect to any suitable mobile network, meaning that the functionality of the client device described with reference to the second mobile network may also be provided for the first mobile network and vice versa. Similarly, functionality described for any network entity in the first mobile network, e.g., for an application server, may equally apply to a corresponding network entity in the second mobile network and vice versa.

The client device may, when connected to the first mobile network, retrieve the application context of the application service from the first mobile network. The application context may for example be generated and maintained by the application server on which the application service is located. Here, the term 'retrieving' may refer to the receiving of the application context, which may, but does not need to, involve the client device actively initiating such receiving, e.g., by sending a request or subscribing for updates to the application context. Furthermore, retrieving the application context 'from the first mobile network' may refer to the retrieval of the application context from a network entity of the first mobile network which has access to the application context. This network entity may typically be the application server hosting the application service, but in some examples also a context repository system which may function as a central repository for application contexts within the first mobile network or any other network entity with access to the application context. Such retrieval of the application context may effectively correspond to a downloading of the application context, for example as an integral copy thereof or in form of one or more incremental updates. As a result, the client device may have a local copy of the application context stored in the data storage. Here, the term 'copy' may denote that the application context may at the time of retrieval still reside in the first mobile network, while the adjective 'local' may refer to the copy being stored on-device, e.g., locally in a data storage of the device.

When at some point in time the client device is connected to a second mobile network, for example due to the aforementioned loss in connectivity to the first mobile network or due to the aforementioned change in service requirements of the client device or due to the source network not being able (anymore) to fulfil the initially agreed service requirements, the client device may seek to continue to utilize the application service from this second mobile network. For that purpose, the application service may be deployed in this second mobile network, for example by the client device or triggered by the client device or because the application service already exists in the second mobile network. To ensure or at least support service continuity, the client device may upload the local copy of the application context to this second mobile network, with this network therefore representing a 'target' for the application context and therefore being referred to as a 'target mobile network'. Such uploading may for example involve the client device sending the application context to a network entity in the second mobile network. The network entity may typically be the application server hosting or being intended to host the application service but may in some examples also be a context repository system which may function as a central repository for application contexts within the second mobile network. In this respect, it is noted that 'sending the application context to a second application server' may include sending the application context to the second application server via such a context repository system as intermediate entity. The client device may thus transfer the application context from the first mobile network to the second mobile network by, when connected to the first mobile network, generating an on-device copy of the application context, and uploading the on-device copy to the second mobile network once connected thereto.

The above measures may have the effect that the transfer of the application context may be performed by the client device itself, with the transfer therefore not having to rely on the existence of network connectivity between the first mobile network and the second mobile network. While such connectivity may in some cases exist between public mobile networks, e.g., between PLMNs, such connectivity may not always exist between or to/from private mobile networks, e.g., between NPNs or between PLMNs and NPNs, or may be dependent on an unstable connection and thereby may only be intermittently available. In some cases, network connectivity may be available, but may be limited in nature, for example limited to certain types of network traffic (e.g., due to privacy and/or security reasons).

An advantage of the above measures may therefore be that the reliability of the transfer of the application context may be increased with respect to a scenario in which the application context would otherwise have to be transferred via an unstable or only intermittently available network connection between the first mobile network and the second mobile network. In particular, it may be difficult to predict to which second mobile network the client device will connect to in the future. As such, it may be difficult to predict whether such transfer of the application context via a network connection between the first mobile network and the second mobile network will be possible or not, or even when it is in principle possible, whether such transfer will be successful. By having the client device effectively carrying along a local copy of the application context in its data storage, the application context may be delivered to any second mobile network irrespective of its connectivity to the first mobile network. Another advantage may be that no transfer mechanism may be needed within the first mobile network to send the application context directly to the second mobile network, or within the second mobile network to retrieve the application context directly from the first mobile network. Yet another advantage may be that privacy and/or security of the application context may be better safeguarded, in that the application context may be transferred via the client device itself rather than via a possibly unsecure network connection between the first mobile network and the second mobile network.

The following embodiments may represent embodiments of the client device and corresponding computer-implemented method performed at the client device, but may, unless otherwise precluded for technical reasons, also represent embodiments of the network node(s) and corresponding computer-implemented method where its processor subsystem is configured to perform corresponding step(s).

In an embodiment, the processor subsystem of the client device may be configured to retrieve the application context as an integral copy of the application context or as incremental updates containing changes with respect to a previous copy of the application context stored in the data storage. The client device may also alternate the retrieval of an integral copy with the retrieval one or more incremental updates. If incremental updates are retrieved, the client device may be configured to maintain an integral copy of the application context by accumulating the incremental updates received over time. By retrieving the application context as incremental updates, the bandwidth required for the periodic retrieval of the application context may be reduced compared to the retrieval of integral copies of the application context. A reduction in bandwidth may also reduce the power consumption of the client device, and thereby, if the client device is battery-operated, improve its battery level.

In an embodiment, the processor subsystem of the client device may be configured to retrieve the application context from the first application server using at least one retrieval procedure selected from a group of retrieval procedures. The group of retrieval procedures may comprise:
  periodically receiving the application context from the first mobile network, for example by periodically requesting the application context from the first mobile network;
  subscribing with the first mobile network to periodically receive the application context from the first mobile network; and
  receiving the application context from the first mobile network when the client device is estimated to move outside of a coverage area of the first mobile network.

There may be numerous ways for the client device to retrieve the application context, either periodically or intermittently. These ways may elsewhere also be referred to as 'retrieval procedures'. The client device may support one but also several of these retrieval procedures. For example, in one retrieval procedure, the client device may periodically request the application context from the first mobile network, and in response, periodically receive the application context. Another retrieval procedure may involve the client device sending a single request for the application context to be periodically sent by the first mobile network to the client device. Another retrieval procedure may involve the client device subscribing with the first mobile network to periodically receive the application context, e.g., using a publish-subscribe model. Yet another retrieval procedure may involve receiving the application context 'just in time', for example when the client device is estimated to move outside of the coverage area of the first mobile network. An advantage of sending a single request or subscribing with the first mobile network may be that it may not be needed for the client device to send periodic requests to the first mobile network, which may save bandwidth and battery power of the client device. An advantage of sending the application context 'just in time' to the client device may be that even less network bandwidth and/or battery power may be needed, as it may suffice to send the application context only once just before a disconnect.

In an embodiment, the processor subsystem of the client device may be configured to, when the client device is connected via the radio interface to the first mobile network, periodically retrieve the application context from the first mobile network so as to periodically synchronize the local copy of the application context in the data storage with the application context of the application service. It may not always be possible to predict when the client device may switch between mobile networks. For example, a change in service requirement may occur suddenly, or the route followed by the client device may unexpectedly lead the client device outside of the coverage of the first mobile network. As such, it may not always be possible to retrieve the application context 'just in time', meaning just before a switch between mobile networks. To address this problem, the local copy of the application context may be kept synchronized with the application context of the application service while the client device is connected to the first mobile network. For that purpose, the client device may periodically retrieve the application context from the first mobile network, for example by periodically requesting the application context or by subscribing for periodic updates to the application context to be sent from the first mobile network or by the first mobile network periodically sending the application context without an explicit request from the client device. As such, when a disconnect happens, the local copy of the application context may be relatively up to date. An advantage of this embodiment may be that it may not be needed to predict when the client device will switch between mobile networks, while still ensuring that the local copy of the application context which is kept on-device is relatively up to date.

In an embodiment, the processor subsystem of the client device may be configured for at least one of:
  exposing to the second mobile network which one or more retrieval procedures from the group of retrieval procedures are supported by the client device; and
  retrieving from the second mobile network which one or more retrieval procedures from the group of retrieval procedures are supported by the second mobile network.

The retrieval of the application context using one or more of the aforementioned retrieval procedures may depend on both the client device and the mobile network supporting the respective retrieval procedure(s). For one party (e.g., the client device or the mobile network) to inform the other party of the supported retrieval procedures, the client device may expose the supported retrieval procedures to the mobile network or may retrieve a list of supported retrieval procedures from the mobile network. This way, either party or both parties may determine which retrieval procedure(s) may be used. It will be appreciated that the above functionality is described with reference to the second mobile network, since some time after sending the application context, the client device may again start retrieving the application context, e.g., to anticipate for a future disconnect from the second mobile network. However, the above functionality of the client device and/or of the second mobile network may also be provided in respect of any suitable mobile network, including but not limited to the first mobile network.

In an embodiment, the processor subsystem of the client device may be configured to negotiate with the second mobile network which one or more retrieval procedures from the group of retrieval procedures to use. By negotiating with each other, the client device and the second mobile network may agree upon which retrieval procedure(s) to use. This way, it may be avoided that the client device tries to use or attempts to rely on a retrieval procedure which is not supported by the second mobile network, or vice versa.

In an embodiment, the processor subsystem of the client device may be configured to, if data communication with the second mobile network indicates that the second mobile network does not provide support for the transfer of the application context by the client device and/or that the second mobile network cannot provide the application service, disconnect from the second mobile network. Since the client device may seek to maintain service continuity in its utilization of the application service, it may prefer to connect to a mobile network which supports this service continuity. Such support may involve the second mobile network being able to provide application service, but also the second mobile network supporting the transfer of the application context. The latter may involve two aspects: the one hand, the second mobile network may need to support the client device sending an application context, e.g., as previously retrieved from a first mobile network, and may need to support the retrieval of the application context, e.g., to anticipate for a future disconnect of the client device from the second mobile network. The client device may verify whether a number or preferably all of the above criteria are met, and if not, may disconnect from the second mobile network so as to search for a mobile network which does fulfill a number or all of the above criteria.

In an embodiment, the processor subsystem of the client device may be configured to, when the client device is connected via the radio interface to the second mobile network, deploy or trigger deployment of the application service to the second application server. The client device may assist in the deployment of the application service, for example by being directly involved in the deployment of the application service or by triggering the deployment. This embodiment may have the advantage that the client device may be aware of which application service it seeks to utilize and may therefore be able to deploy or trigger the deployment of such an application service. This way, it may not be needed to rely on a network-based mechanism which would otherwise be needed to ensure that the same application service is deployed in the second mobile network as in the first mobile network. Disadvantageously, such a network-based mechanism may suffer from the same disadvantages as previously described for the direct transfer of the application context between mobile networks, e.g., a lack of connectivity or connectivity being intermittent or limited in nature.

In an embodiment, the processor subsystem of the client device may be configured to deploy or trigger the deployment of the application service by at least one of:
  uploading an application to the second mobile network to be executed by the second application server, wherein the application may be configured to provide the application service;

requesting the second mobile network to deploy the application service by downloading the application from a repository.

The application providing the application service may be stored on-device, e.g., in the same data storage as the application context. In such a case, the client device may upload the application service, for example if the second mobile network cannot retrieve the application service from a repository. An advantage of this embodiment may be that one may not need to rely on external repositories or the like for the deployment of the application service. The client device may also request the second mobile network to deploy the application service from a repository, even in cases where the application is also stored on-device. This way, the client device may indicate which application service is needed, but the application itself may be retrieved from the repository. This may save network bandwidth and battery of the client device.

It will be appreciated by those skilled in the art that two or more of the above-mentioned embodiments, implementations, and/or aspects of the invention may be combined in any way deemed useful.

Modifications and variations of any one of the systems or devices (e.g., client device, network node(s), network function, etc.), computer-implemented methods, metadata and/or computer programs, which correspond to the described modifications and variations of another one of these systems or devices, computer-implemented methods, metadata and/or computer programs, or vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1A:
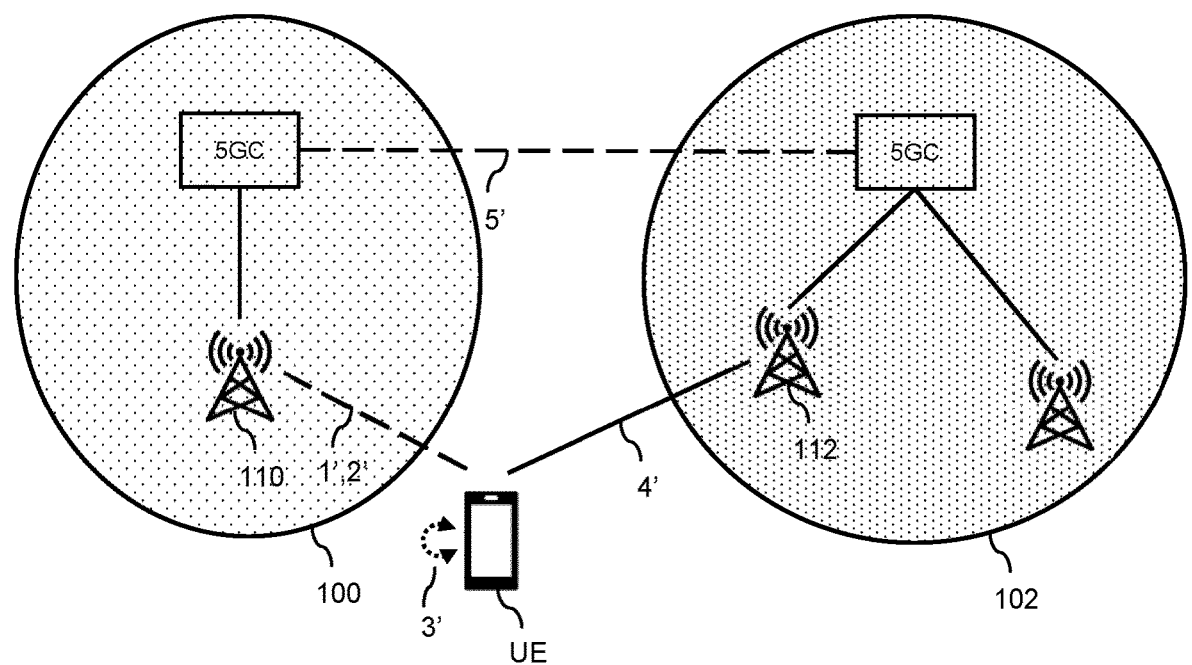
FIG. 1A shows a client device moving from a source network to a target network, in which an application context is transferred from the source network to the target network via a network interface between the networks.

It should be noted that items which have the same reference numbers in different figures, have the same structural features and the same functions, or are the same signals. Where the function and/or structure of such an item has been explained, there is no necessity for repeated explanation thereof in the detailed description.

REFERENCE SIGNS LIST

The following list of references and abbreviations is provided for facilitating the interpretation of the drawings and shall not be construed as limiting the claims.

5GC 5G core network
AS application server
AMF access and mobility management function
NETW network
NF network function
RAN radio access network
SMF session management function
UE user equipment
UPF user plane function
1-11 messages/steps in information exchange
1'-5' messages/steps in information exchange
1"-7" messages/steps in information exchange
100, 102 mobile network
110, 112 radio access point
120 application context
200 authorization and authentication
201 registration accept
202 service request (supported procedures)
203 request approved (supported procedures)
204 select context retrieval procedure
210 periodical context retrieval
212 publish-subscribe context retrieval
214 just in time context retrieval
300 procedure to connect to network, and select a context retrieval procedure
302, 303 select retrieval procedure messages
304 procedure to select context retrieval parameters
310 context retrieval request message
312 context retrieval response message
314 context retrieval message
316 subscribe to context updates message
320 wait periodic interval
322 wait back-off interval
330 disconnect procedure
340 tracking request
342 UE tracking
344 UE leaving trigger
400 processor system representing client device
410 radio interface
420 processor subsystem
430 data storage
500 processor system representing network node(s)
510 network interface
520 processor subsystem
530 data storage
600 computer-readable medium
610 non-transitory data
1000 exemplary data processing system
1002 processor
1004 memory element
1006 system bus
1008 local memory 1010 bulk storage device
1012 input device
1014 output device
1016 network adapter
1018 application

DESCRIPTION OF EMBODIMENTS

FIG. 1A shows a client device which by way of example is a user equipment (UE) of a 5G mobile network. For sake of explanation, the client device may elsewhere also simply be referred to as a 'UE' and any mobile network may elsewhere also simply be referred to as 'network', but with the understanding that the client device may also be a non-UE device or a UE of another generation (e.g., 6 or later) mobile network. The UE may at a given time be connected to a first mobile network 100, e.g., by having a radio connection to a radio access point 110 of the first mobile network 100. An example of such a radio access point 100 may be a gNodeB of a 5G mobile network. Although not shown in FIG. 1A, the UE may utilize an application service provided by the first mobile network 100 (with the application service being in the following also simply referred to as 'service'). For example, the UE may utilize an edge application service, which may be provided by an edge application server (EAS) in an edge data network (EDN) connected to the first mobile network 100. See for example section A.2.3 of 3GPP TS 23.558 further detailing such edge application servers.

The UE may at a later moment in time switch from the first mobile network 100 to a second mobile network 102, namely by connecting to radio access point 112 of the second mobile network. Such switching may for example be due to the UE moving outside of the coverage area of the first mobile network 100 or the application service requirements of the UE having changed. In the example of FIG. 1A, there may be data connectivity between the core network ('5G core', in short 5GC) of the first mobile network 100 and the core network of the second mobile network 102.

When the UE now switches from the first mobile network 100 to the second mobile network 102, e.g., as shown in FIG. 1A, the following steps may be performed to transfer the application service utilized by the UE from the first mobile network 100 as source network to the second mobile network 102 as target network. These steps may be the following, with their numbering matching reference numerals in FIG. 1A which may denote between which entities a respective step may take place:

1'. The edge application service may be stopped
 2'. UE may disconnect from the first mobile network (e.g., source network)
 3'. UE may select the second mobile network (e.g., target network)
 4'. UE may connect to the second mobile network
 5'. An application context of the edge application service may be transferred from the EAS in the source network to a EAS in the target network.

As is also explained elsewhere, the application context may be a set of (processed) data about the application. For step 5', a dedicated transfer mechanism may be used to transfer the application context from a source EAS to a target EAS to support service continuity. This procedure may be called Application Context Transfer (ACT), e.g., as elucidated in section 8.8 of 3GPP TS 23.558, and may take place in the application layer and may use additional network functions (such as the AC (Application Client), EEC (Edge Enabler Client), EES (Edge Enabler Server)) to transfer the application context directly from the source network to the target network.

However, the transfer of the application context may conventionally only be supported within the same mobile network (e.g., PLMN) between the network's own EASs. Also, handover between private and public networks may only be (partially) supported in Public Network Integrated Non-Public Network (PNI NPN) deployments and not supported at all in Stand-alone Non-Public Network (SNPN) deployments. This may be problematic in scenarios where UEs utilizing mission critical application services may need to seamlessly switch between private and public networks.

Furthermore, given the vast amount of small-sized non-public networks (NPN) with their own policies and capabilities, many of these networks may be interconnected using best-effort/non-dedicated backhaul networks or not at all. Moreover, in contrast to public networks, NPNs may have very limited coverage, and, due to security and privacy reasons, may wish to expose as little information to UEs as possible (e.g., data of other applications running in the edge server, coverage). The large diversity in networks with their respective policies and capabilities may introduce the following obstacles to transferring application contexts between networks:

- Lack of resources/capabilities to execute certain services. NPNs may be customized and optimized to service their own client devices and their respective use-cases. Consequently, the NPN might not support an application service request by a client device for another, non-originally envisioned application service.
- Lack of interworking between NPNs and public networks. An NPN operator might choose to limit the external connection (e.g., towards the other SNPNs, or the public network) due to security or privacy reasons. Similarly, depending on the geographical circumstances, an NPN operator might not be able to support interworking at all (e.g., NPN at remote locations, NPNs for disaster relief).
- Lack of interoperability between NPNs and public networks. Due to the ability to fully customize their networks, different NPNs and/or public networks might support different procedures with products from different vendors, limiting the connectivity between the different NPNs and/or public networks.

Hence, a client device in an ambulance or carried by a first responder, which may be connected to an NPN, may eventually, and potentially frequently, need to switch between different NPNs while keeping its mission critical application service intact. However, due to the abovementioned obstacles associated with the NPNs, the connection between two networks (source and target network) may be:

1. Non-existent. In this case, either the source network or the target network, or both, may be deployed as a connectivity 'bubble' that may not have any external connection.
2. Intermittent. In this case, either the source network or the target network, or both, may have an unstable external connection that is only sporadically present. Here, connected UEs may try to send data to a remote location opportunistically when an external connection is present, and UEs may use the NPN for local services.
3. Limited. In this case, either the source network or the target network, or both, may limit their external connection or choose to limit the connection between the two networks to only certain types of traffic (e.g., due to privacy and/or security reasons). For example, the two networks may not wish to exchange data traffic with each other (including data for migrating an application service from one network to another). However, the networks might allow other types of data to be exchanged, such as authorization/authentication messages.
4. Fully functional. In this case, both networks may be fully connected and may allow for the exchange of all or most types of data with each other.

When the two networks have non-existent, intermittent, and limited connectivity, the dashed line between the core networks in FIG. 1A may represent such non-existent, intermittent, and limited connectivity. This means that the transfer of the application context via the network interface between the respective core networks in step 5' may be hindered. Disadvantageously, when the application context is not transferred from the source network to the target network (as in step 5' in FIG. 1A), stateful services (e.g., services that may keep track of previously processed requests and their outcomes, and that, consequently, may react differently to the same inputs based on this history) may face the following problems during migrations:

Failure to achieve forward progress. The UE may be stuck in a loop of re-executing the same requests. For example, every time the application service is migrated, the UE may need to start from the beginning, and all progress would be lost.

Inconsistent behavior. Due to being unaware of the previously processed requests, the application server may react inconsistently by, for example, rejecting a valid UE's request.

Hence, to avoid the abovementioned problems, the application context may be transferred from the source network to the target network. Hence, before the client starts using the application service in the new (target, second) mobile network, a procedure that transfers the application context as it was when the client device disconnected from the old (source, first) mobile network may preferably exist. Preferably, such a procedure may support one or both of the following scenarios:

UEs moving between different NPNs administered by the same organization and belonging to that NPN.

Authorized UEs that are using an NPN that they do not belong to for supplementary coverage. Hence, the UE would not belong to either the source network or the target network, or both.

Figure 1B:
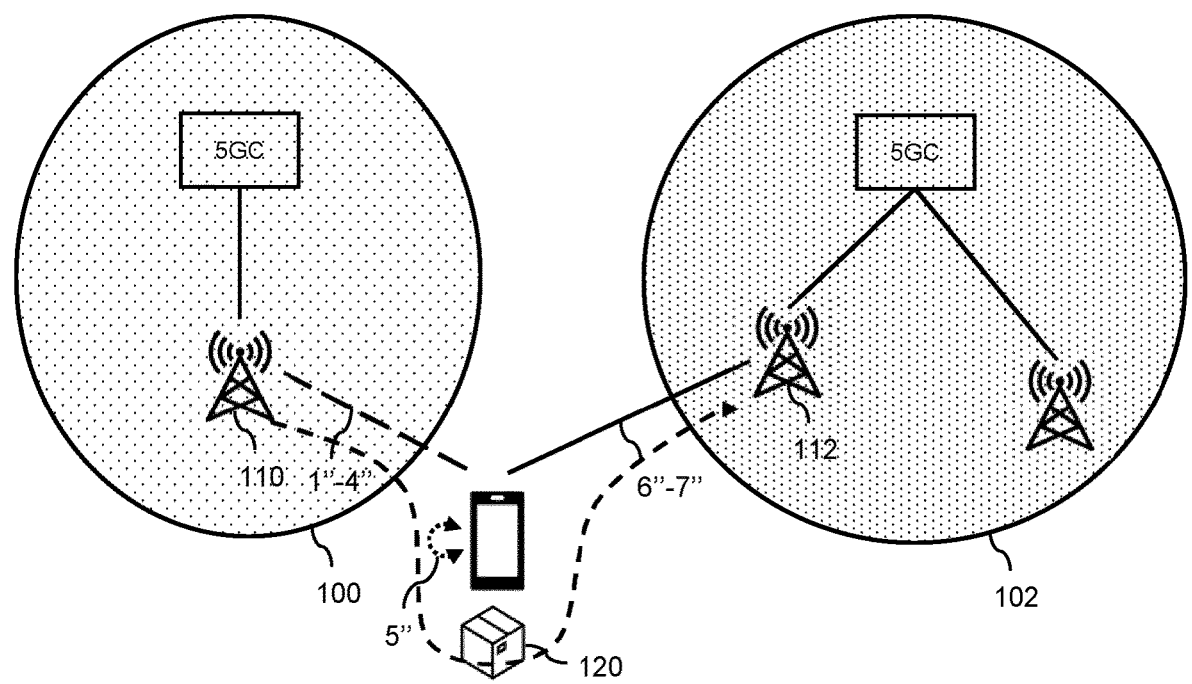
FIG. 1B shows a client device moving from a source network to a target network, in which an application context is transferred by the client device retrieving the application context from the source network, and once connected to the target network, sending the application context to the target network for deployment.

FIG. 1B shows a UE moving from the source network 100 to the target network (e.g., public or private) 102, in which an application context may be transferred by the UE, namely by the UE retrieving the application context from the source network, and once connected to the target network, sending the application context to the target network. Essentially, the client device may assist in relocating the application service between networks (e.g., between private or public networks), which may also be referred to as 'UE-assisted context transfer'. Such an application service may for example be provided by a single or multiple applications running on an edge application server, and the application context may be a set of (processed) data about a respective application. For that purpose, the application context transfer procedure shown in FIG. 1A may be modified to yield the following steps enumerated below, with the numbering of the steps matching reference numerals in FIG. 1B:

1". The UE may connect to a network according to the UE's service requirements and select an application service context retrieval procedure 2". The application service may be deployed in the network, e.g., in the form of a container application(s), for example sent from the UE or retrieved from an external repository accessible via e.g., via the internet.

3". A context retrieval procedure may be performed so that the UE receives the latest application context before a possible disconnect. Possible disconnects may be predicted by the network (e.g., by the network tracking the UE's location in combination with the UE's planned route which the UE may have shared with the network in step 1"). The application context retrieval procedure may retrieve the full application context (e.g., in first retrieval) or the difference with respect to a prior application context. The latter may effectively correspond to an incremental backup.

4". The UE may decide to stop the application service and disconnect from the network, for example due to the UE's internal or an external trigger (e.g., due to a UE mobility event update or an application service requirement change).

5". The UE may discover and select a target network, for example using standardized procedures.

6". The UE may connect to the target network and deploy or trigger the deployment of the application service (e.g., as in step 1"-2").

7". The UE may send the application context to the target network and perform a context retrieval update (e.g., as in step 3").

In the above step 3", before disconnecting from the source network (e.g., from the first mobile network 100), the UE may receive the application context 120 associated with the application service, with this application context being shown in FIG. 1B as a 'package' 120. To (re)start the application service from the target network (e.g., the second mobile network 102), the UE may send the application context to the target network (step 6" and 7"). Therefore, in contrast to the application context transfer mechanism shown in FIG. 1A, the UE may in FIG. 1B act as a 'bridge' between the two networks by carrying along a local copy of the application context 120.

Retrieval Procedures

To synchronize the application context from the mobile network to the UE, a so-called application context retrieval procedure may be used, which may elsewhere also be simply referred to as 'retrieval procedure'. The following shows, by way of example, three procedures (A, B, and C) that may be used depending on, for example, the application service, 5G core capabilities, and/or operator or user preferences.

A. Periodical context retrieval. The UE and the network may periodically synchronize the application context. This way, the UE may be aware of the application context until the last retrieval and may redeploy the application service with this application context in case the UE disconnects from the current network (for example due to lack of coverage) and needs to connect to a new network (e.g., private or public). This retrieval procedure may be used for NPNs that do not wish to share any internal coverage information with the UE resulting in the UE being unaware of the exact switching moment in case the UE needs to switch for coverage reasons. The period at which the application context is retrieved may be a configurable parameter and may be agreed upon in advance (e.g., during the application service deployment). By lowering this period, the probability that the UE disconnects with an outdated application context decreases and, with it, the amount of work that may need to be re-executed at the new destination network. However, if set too high, the amount of data that needs to be exchanged between the UE and the network may become a bottleneck. Hence, to prevent overloading the UE or the network with context retrieval messages, both of them may indicate the minimum interval they support or prefer to support. Moreover, for services that support them, differential context updates may be sent instead of a complete context. The primary way this retrieval may occur may be:
1. Request-response model. In this sub-procedure, the UE may request a context retrieval from the network, and upon receiving a response, update its locally stored application context. In this sub-procedure, the UE may itself decide when to send the request and, consequently, may have more control over the context retrieval procedure. However, since the UE may be unaware of application context changes, the UE may at times send unnecessary requests (e.g., requests leading to the same response since the application context did not change since the last request).
2. Publish model. In this sub-procedure, the network may periodically send a context update to the UE. In this sub-procedure, the network may decide when to send the request and, consequently, may have more control over the retrieval procedure. Compared to the request-response model-based retrieval sub-procedure, the amount of traffic in this sub-procedure may be reduced by around a factor of two, since mainly one-directional traffic may be needed, e.g., from network to the UE.

B. Publish-subscribe context retrieval. In this procedure, the UE may subscribe to context updates from the network. The network, if a context change occurs, may send the UE a context update message (e.g., a publish message). In the case of infrequent context changes, this procedure may be more efficient than procedure A, and may reduce the number of messages that the UE and the network may need to exchange. However, if the application context changes occur very frequently, the network may send too frequent updates to the UE. In this case, to limit the number of exchanged messages, the UE and the network may agree on a back-off period, e.g., a minimum period between the two subsequent publish messages. Moreover, in contrast to procedure A, in this procedure, the UE may have less control, and may be more dependent on the network to correctly handle the application context updates. Moreover, since the network is the entity that determines when to publish an application context update, the chosen moment may be non-ideal for the UE.

C. Just-in-time (JIT) context retrieval. In this procedure, the network may track the UEs movement and may anticipate the moment the UE may move out of coverage, for example by predicting the UE's movement and correlating the predicted movement to its internal coverage map. When the network determines that the UE is likely to leave its coverage area, the network may send the application context to the UE while seeking to ensure that this context transfer process will complete before the UE needs to disconnect from the network. While this procedure may significantly reduce the amount of information exchanged between the UE and the network, it may also depend on the network's capabilities (e.g., tracking the user and predicting its movements) and may only be used with networks that support this capability.

In some embodiments, a hybrid/dynamic procedure may be used whereby either the UE or the network may decide to change retrieval procedure depending on current preference or conditions or use multiple retrieval procedures (e.g., A and B) at the same time (e.g., use the periodical context retrieval throughout the connection, and just-in time-context retrieval before disconnecting). Moreover, as explained elsewhere, a procedure may be provided to select the most applicable retrieval procedure based on the preferences and capabilities of both the UE and the network.

In the case that there has not been any application context change between retrieval messages (e.g., in case of a stateless service), the UE may receive only an application context constituted by a minimal amount of data, for example as defined in table 1 below. This way, the UE may stay aware that the application service is still running as expected and that there has not been any change in the application context.

Application Context

The application context may, for example in case of an edge application service, be a set of data about and/or from the application client that resides in the edge application server, for example as defined in 3GPP TS 23.558. It will be appreciated that for a non-edge application service, the application context may take a similar form, mutatis mutandis. A non-limiting example of an application context is the following, in which a set of metadata may be retrieved at all times and in the case of an application-related data change, additionally data may be retrieved, for example specifying changes in the application-related data with respect to a previously retrieved context. Some data types may be optional depending on operator preferences/capabilities and/or the application service. In this respect, it is noted that any data which is not identified as optional only refers to the data being non-optional for this particular example, and not in general for application contexts.

TABLE 1

| Application metadata | Application data | Description/purpose |
| --- | --- | --- |
| Timestamp | | Time of data message |
| (optional) EAS capabilities (compute, storage, OS) initially shared by network during registration and the current usage of the capabilities (e.g., percentage of compute, storage) | | Understand reliability of running the application service or potential risks if usage is approaching limits. Might trigger disconnection and connecting to more suitable network. |
| (optional) Geographic location of EAS | | Estimate reliability of connectivity (e.g., closer may be better) |
| Application ID | | Application identifier to which the application context belongs, there could be multiple applications within the application service. |

TABLE 1-continued

| Application metadata | Application data | Description/purpose |
|---|---|---|
| EAS System status | | Operational status indicators of the EAS where the application runs (e.g., fully or partially up/down) |
| Network status | | Same as EAS but for network |
| Application related data change flag | | Whether the application related data has changed since the prior retrieval. |
| (optional) Charging information | | The cost (e.g., financial cost) built up so far of using the network's connectivity services. May lead to a trigger to disconnect and find another more suitable network. |
| | Application-related data, which can be complete in initial retrieval or incremental in all the subsequent retrievals for incremental backup. | The set of application-related data that contains everything, or at least most relevant data, that the application service (and its application(s)) would need to resume where they were stopped. |

Figure 2:
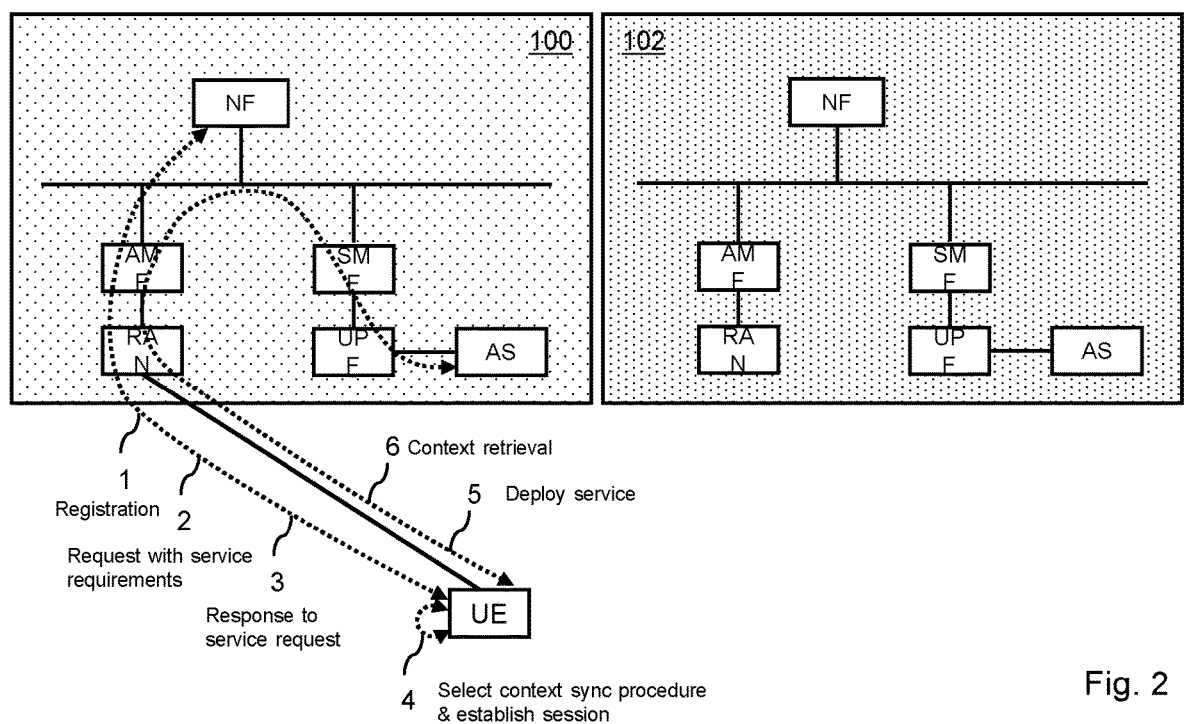
FIG. 2 illustrates a client device registering with a source network, requesting an application service to be provided, retrieving an application context of the application service and storing the application context as a local copy.
Figure 3:
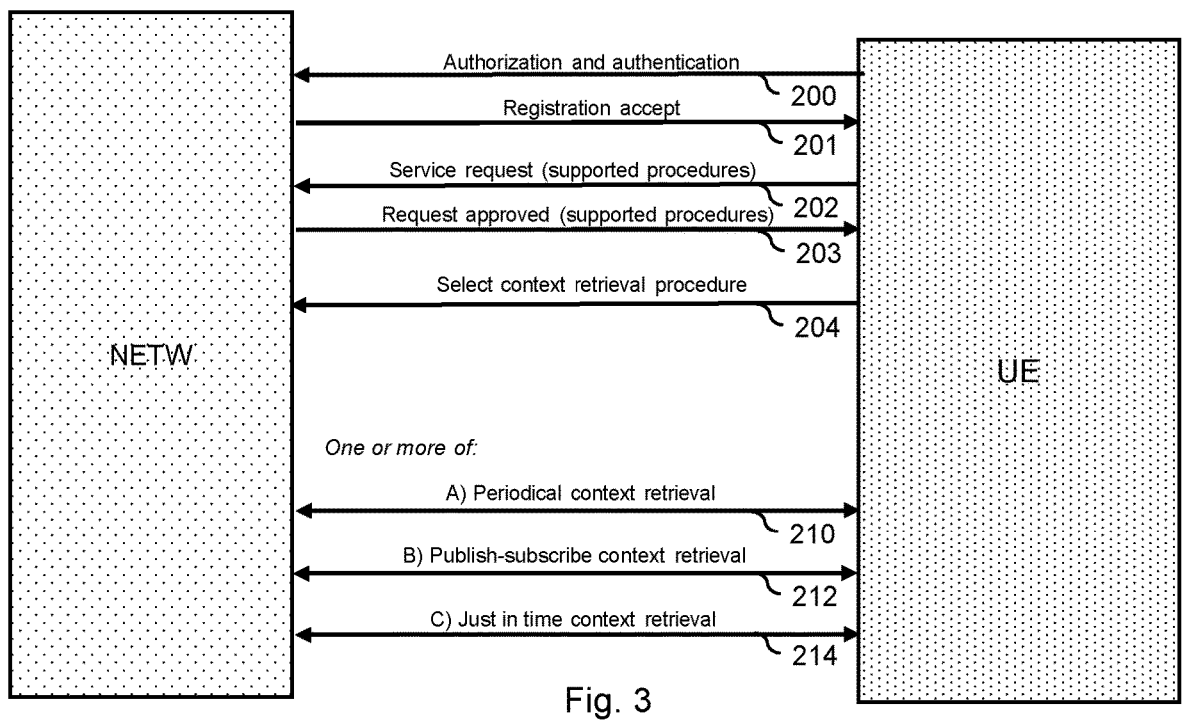
FIG. 3 shows a message exchange associated with FIG. 2.

The following may describe the application context transfer using a client device in more detail by referring to two main phases, namely phase I taking place in relation to the source network and phase II taking place in relation to the target network. FIGS. 2 and 3 may represent phase I and may illustrate the client device connecting to the source network, selecting a context retrieval procedure and deploying an application service in the source network. More specifically, FIGS. 2 and 3 show a UE as client device interacting with a network function NF involved in the registration of the UE with the network and with an application server AS. The application server may be the location where the application service resides. FIG. 2 and following also show other network functions of a 5G mobile network adhering to one or more 3GPP standards, such as an AMF, SMF and UPF. However, these network functions and their presence are merely exemplary.

Phase I may involve the steps enumerated below, with the numbering of the steps matching reference numerals in FIG. 2 while FIG. 3 may show messages sent between the UE and the network (e.g., the NPN) during these steps.

1. 'Registration': the UE may initiate a registration procedure with the network using one or more network functions NF of the network (e.g., 3GPP-defined network functions including but not limited to AUSF, NRF, UDM, PCF, AF, etc.).

While registering, the UE may authenticate itself. Based on the authentication, the network may decide and respond with whether it wishes to allow or to reject the connection. This may be according to standardized procedures. See also the 'Authorization and authentication' message 200 shown in FIG. 3.

2. 'Request with service requirements': upon successful authentication, e.g., resulting in a 'Registration accept' message 201 as shown in FIG. 3, the UE may send a service request to the network, e.g., in form of a 'Service request (supported procedures)' message 202 as shown in FIG. 3. In that request, the UE may also notify the network that it supports application context transfer, which one or more retrieval procedures are supported by the UE and may indicate that it wishes to may make use of context retrieval. The UE may also specify application service requirements in the service request, which requirements may include one or more of the following: the necessity of a connection to the internet or not, required bandwidth, planned route (so that the network may check if it would have coverage), required computing capacity, required maximum latency, etc.

3. 'Response to service request': the network may respond to the service request with whether the network can fulfill the specified application service requirements, e.g., in form of a 'Request approved (supported procedures)' message 203 as shown in FIG. 3. Several situations may occur, including but not limited to:

a. The network may accept the request, upon which the UE may proceed to step 4. In the response, the network may indicate the (sub)set of the application context retrieval procedures that it supports from the set it received from the UE.

b. If the network may only partially satisfy the specified application service requirements, the network may reply with values for the requirements it can fulfill. Based on the accepted requirements (and possibly other parameters such as urgency), the UE may decide whether to stay connected or not. In the response, e.g., in the message 203, the network also may indicate the (sub)set of the application context retrieval procedures that it supports from the set it received from the UE.

c. The network may reject the request. For example, if the network does not support any of the context retrieval procedures which are supported by the UE, the network may reject the service request.

The UE may repeat steps 1 to 3 until it has found a suitable network.

4. 'Select context sync procedure & establish session': the UE may select a context retrieval procedure that the UE wishes to use, e.g., in the form of a 'Select context retrieval procedure' message 204 as shown in FIG. 3. For the aforementioned context retrieval procedures A and B, parameters such as retrieval period and back-off period may also be selected by the UE. It is noted that criteria for parameter selection are explained in more detail elsewhere in this specification.

5. 'Deploy service': the UE may deploy or trigger the deployment of the application service in the network, which application service may in this example be provided by the aforementioned application server AS. The application service may for example be provided by a container application which the AS may download from an external repository if the AS has connectivity towards the external repository (e.g., via the Internet). If connectivity to such an external repository is lacking, the AS may notify the UE, after which the UE may send the container application to the AS and instruct the AS to deploy the container application.

6. 'Context retrieval': the UE and the function that maintains the application context (being in this example the AS) may perform the application context retrieval procedure(s). The data in the application context may be defined according to table 1.

Figure 4:
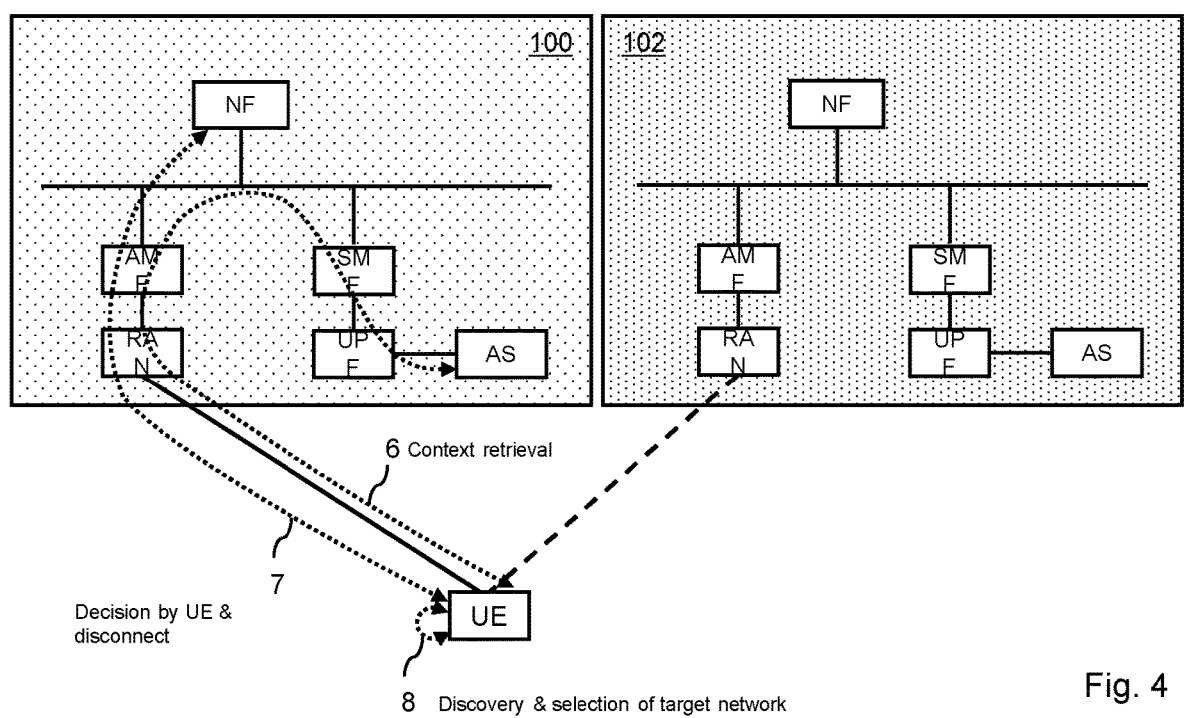
FIG. 4 illustrates the client device of FIG. 2 deciding to disconnect from the source network and discovering and selecting a target network.
Figure 5:
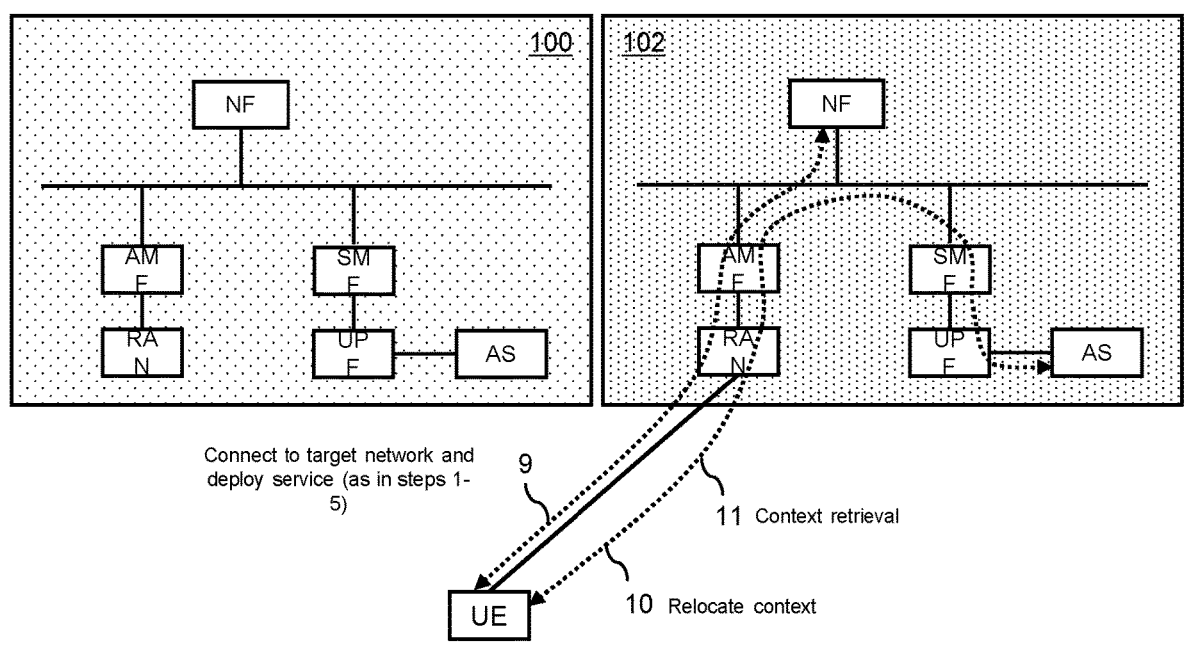
FIG. 5 illustrates the client device registering with the target network, requesting an application service to be provided, and sending the local copy of application context of the application service back to the target network for deployment.

FIGS. 4 and 5 may represent phase II and may illustrate the client device disconnecting from the source network and discovering and connecting to the target network. In particular, phase II may involve the steps enumerated below, with the numbering of the steps matching reference numerals in FIG. 4 and/or FIG. 5. It is noted that for ease of interpretation, FIG. 4 also shows the previous step 6 from FIG. 2.

7. 'Decision by UE & disconnect': the UE may stop the application service and disconnect from the source network after the UE made a corresponding decision, for example due to internal or external triggers. Examples of such triggers include, but are not limited to, the UE moving outside the coverage of the source network, the UE changing its service requirements so that they cannot be fulfilled anymore by the source network or the source network not being able (anymore) to fulfil the initially agreed service requirements. If connectivity is interrupted before the UE can stop the application service, the network itself may stop the application service.

8. 'Discovery & selection of target network': the UE may discover and select a target network, for example using standardized procedures.

9. 'Connect to target network and deploy services (as in steps 1-5)': the UE may connect to the target network and may deploy the application service, for example following steps 1-5 as previously described for phase I.

10. 'Relocate context': the UE may relocate the application context by sending the application context to the AS and may instruct the AS to update the deployed application service based on the application context so as to continue the application service where the application service in the source network was stopped.

11. 'Context retrieval': the application context retrieval procedure may be performed as in step 6 as previously described for phase I.

Identifying Application Context Retrieval Procedure(s)

While requesting an application service, the UE may identify application context retrieval procedure(s) which the UE supports to the network. This information may for example be embedded into an HTTP message as a structured (e.g., JSON format) list with allowed procedures and respective associated parameters (e.g., minimum allowed retrieval interval, back-off interval), for example as:

```
{
    "context_retrieval_procedures":[
        {
            "Periodical context retrieval":[
                {
                    "Model":"request-response",
                    "Min_retrieval_Interval": 10
                    "Max_retrieval_interval": 30
                }
            ]
        },
        {
            "Publish-subscribe context retrieval":{
                "back-off_Interval": 5
            }
        },
        {
            "Just in time context retrieval":{
            }
        }
    ]
}
```

The network may filter the list provided by the UE with the one or more retrieval procedures supported by the network and send the filtered list back to the UE. For example, if the network only supports the periodical context retrieval procedure (e.g., procedure A as described elsewhere), such a response may read as follows:

```
{
    "context_retrieval_procedures":[
        {
            "Periodical context retrieval":[
                {
                    "Model":"request-response",
                    "Min_retrieval_Interval": 20
                }
            ]
        }
    ]
}
```

In such an example, the UE may select the periodical context retrieval procedure (e.g., procedure A) and the higher minimum retrieval interval (e.g., the one indicated by the network, this being higher than then minimum supported by the UE), thereby making sure not to overload the network by sending the application context retrieval requests at a higher rate than the network can or prefers to support.

FIGS. 6A-6D illustrate the retrieval procedures A-C, which have been previously described elsewhere in this specification, in more detail. Shown in general is the network NETW, the network function(s) NF and the application server AS as both discussed previously with reference to FIG. 2, and the UE. Also shown is a procedure 300 to connect to the network and to select the context retrieval procedure, with said procedure 300 being performed jointly by the UE and the network and therefore being depicted in between both entities. Further shown is a message exchange 302 to select the retrieval procedure and a procedure 304 performed by the UE to select context retrieval parameters, for example the minimum retrieval interval as discussed above. Moreover, each of FIGS. 6A-6D shows a disconnect procedure 330 which may be performed when the UE disconnects from the network, e.g., if the UE's service requirements change. It is noted that the following uses a numbering (e.g., 1-4, 1-7, a, b) to identify steps and/or options in the procedures but which do not represent reference numerals in the figures. In addition, procedures and/or sub-procedures may be referred to as 'models', which in turn may refer to a procedure taking place in accordance with a particular model.

Procedure A: Periodical Context Retrieval

Figure 6A:
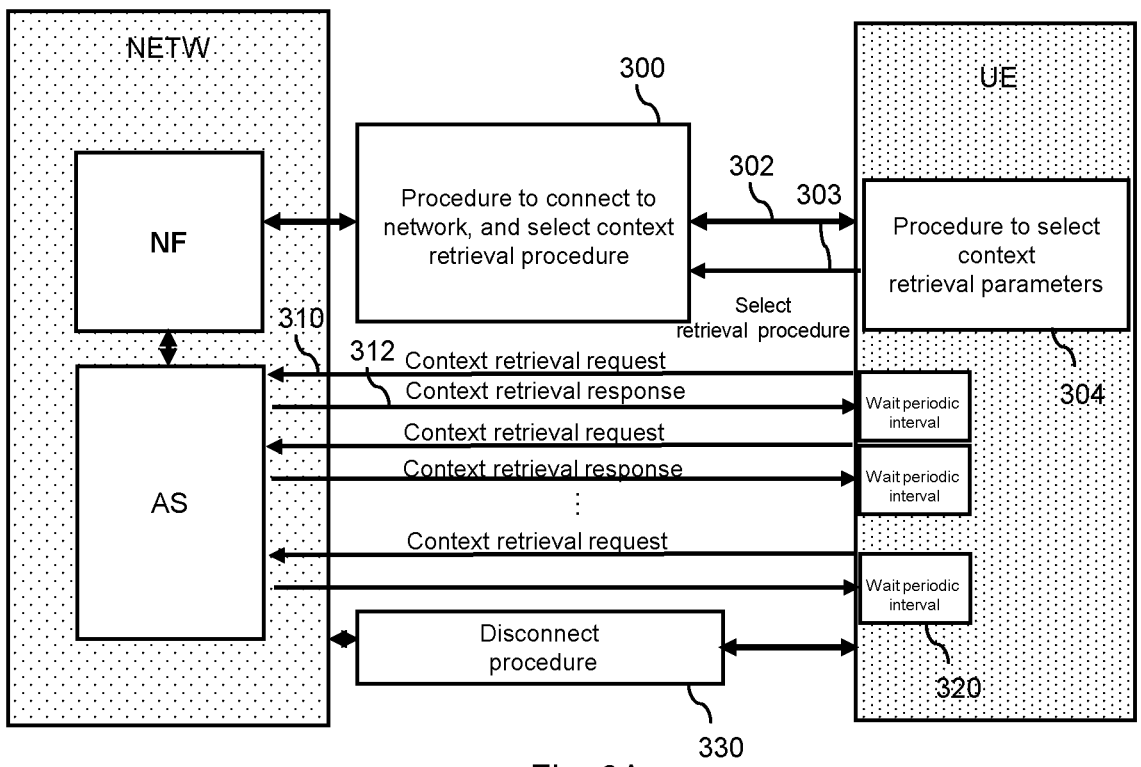
FIGS. 6A-6D illustrate different retrieval procedures.
Figure 6B:
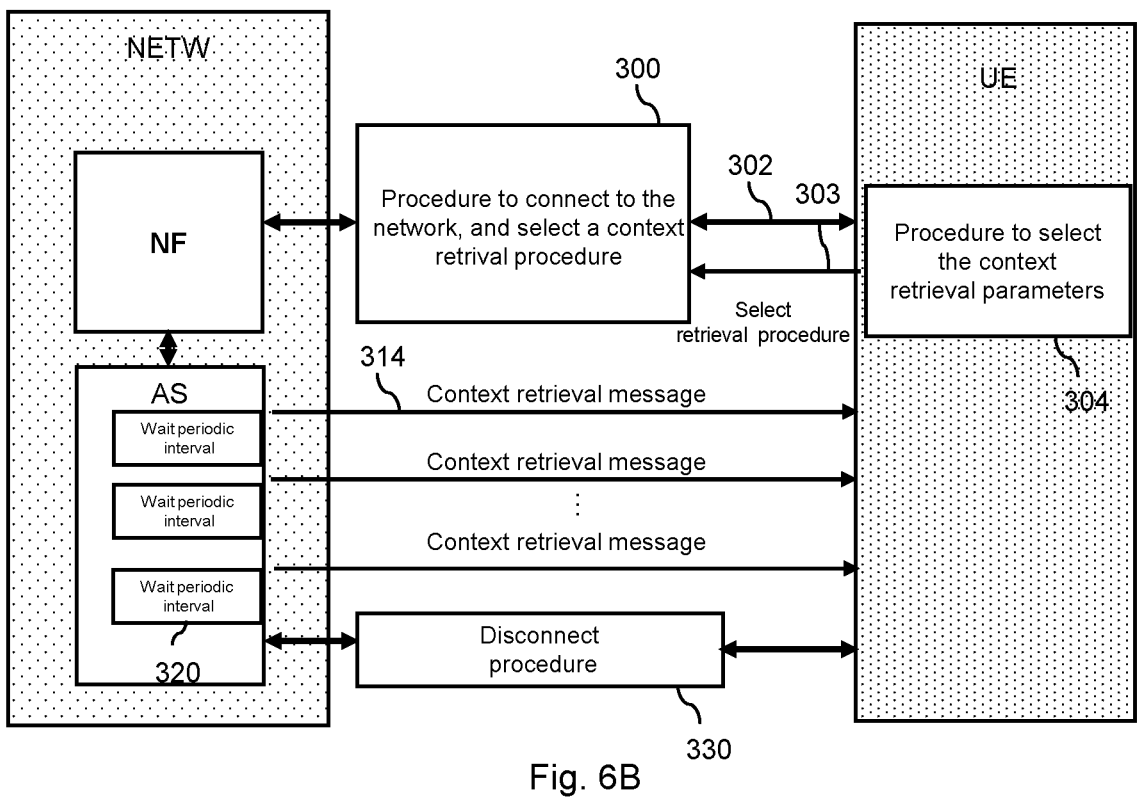

The procedure may be divided into two sub-procedures, namely the request-response model shown in FIG. 6A and the publish model shown in FIG. 6B.

1. The UE and the network may follow the procedure 300 to have the UE connect to the network and select a context retrieval procedure. In the message exchange 302 between the UE and the network, the network may identify the minimum allowed interval the network is capable or prefers to receive the requests at (in case of the request-response model) or to send publish messages (in case of the publish model). The UE may do the same in the message exchange 302, but in addition to a minimum interval, the UE may also select and identify the maximum interval the UE wishes to receive updates. The maximum interval may for example depend on the criticality or requirements of the application service. Based on the message exchange 302, the UE may select the sub-procedure it prefers (if both are supported). Moreover, the UE may use criteria in its procedure 304 to select the application context retrieval interval 320, which may also be named 'Wait periodic interval' as in FIGS. 6A-6B, or in general to select one or more context retrieval parameters. Such criteria may for example be the following for the selection of the content retrieval interval:
   a. The application context retrieval interval should be higher than the identified minimum intervals. This way, the UE may make sure that the network will not be overloaded with more requests than the network is willing to handle.
   b. The application context retrieval interval should be lower than the maximum retrieval interval specified by the UE. This way, the UE may make sure that the application service requirements are satisfied.
2. Two situations may occur in such a selection:
   a. If such a period interval can be selected, the UE may send back a message 303 indicating to the network what retrieval parameters, which retrieval procedure and which retrieval model to use. Furthermore, the UE may adapt its internal configuration to prepare to receive context retrieval information from the network.
   b. If the UE rejects the network capabilities, the UE may disconnect and proceed to try to find a more suitable network for its needs.
3. Through the connection between the network and the UE, the UE may periodically request (in case of a request-response model, see FIG. 6A, using context retrieval request messages 310 and context retrieval response messages 312) or periodically receive (in case of a publish model, see FIG. 6B, using context retrieval messages 314) a context update. The context update may be a full or differential update, for example in case the UE already has an initial application context.
4. Due to changes in UE service requirements and/or in network conditions (e.g., the UE moving out of coverage), the UE may disconnect from the network using the disconnect procedure 330 and use the application context from the last retrieval response from the network to redeploy the application service in a new network to which the UE may subsequently connect to. Such redeployment may for example comprise (a) the UE sending the last application context and instructing the AS to download the application providing the application service from an external repository if connectivity to the external repository exists, (b) or if such connectivity is lacking, the UE may upload the application and the last application context and may instruct the AS to deploy the application.

Procedure B: Publish-Subscribe Context Retrieval

Figure 6C:
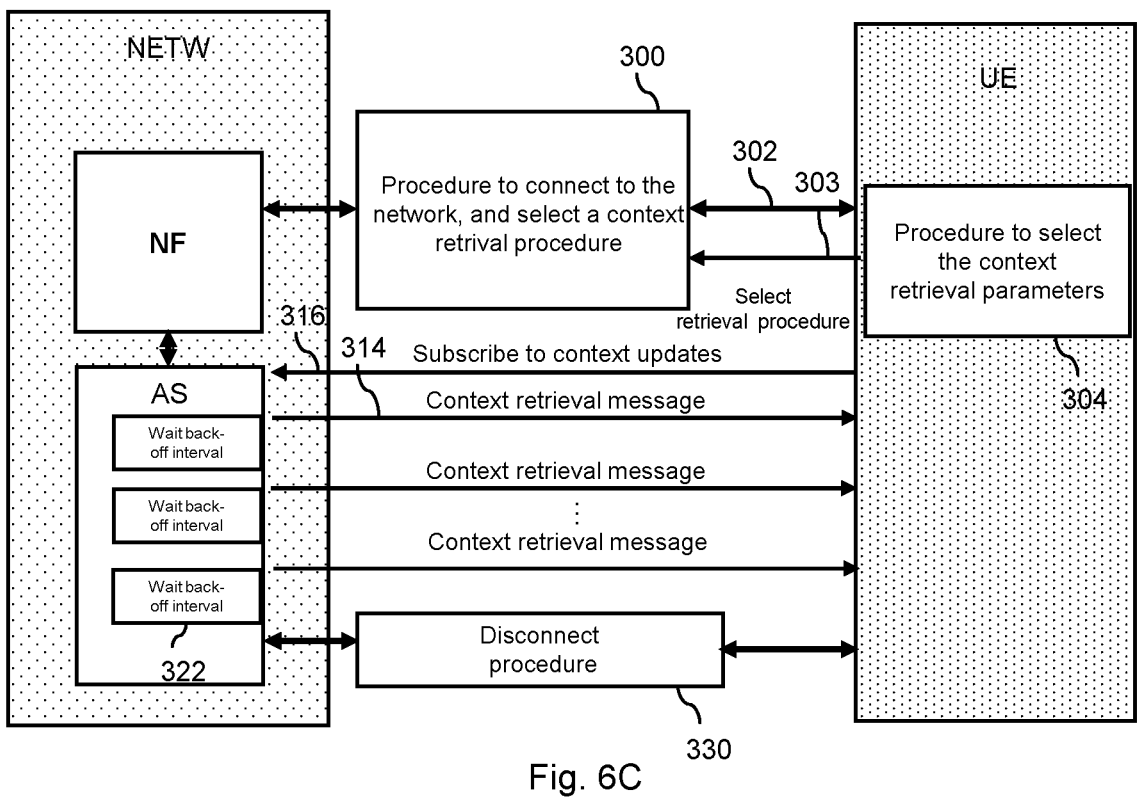

FIG. 6C shows a context retrieval procedure according to a publish-subscribe model. The procedure may be performed in phase I and may comprise:

1. The UE and the network may follow the procedure 300 to have the UE connect to the network and select a context retrieval procedure. In the message exchange 302 between the UE and the network, the UE may receive the network's minimum allowed interval for sending and receiving updates, which is in the example of FIG. 6C also referred to as 'wait back-off interval'. Based on the network's minimum allowed interval value and its own minimum allowed interval, the UE may select a back-off interval 322 which may be higher than both identified minimums, for example by selecting the larger one of both identified minimum allowed interval values.
2. If the procedure 300 is successful, the UE may send back a message 303 indicating to the network what retrieval parameters, which retrieval procedure and which retrieval model to use. In addition, the UE may subscribe with the network for context updates via a subscribe message 316. The UE may further adapt its internal configuration to prepare to receive context retrieval information from the network.
   a. The network may monitor the application context. If the network detects a change in the application context, the network, for example in form of the AS, may send an update to the UE via a context retrieval message 314 and may start the back-off timer, e.g., by counting down from the wait back-off interval 322. The context retrieval message 314 may for example contain an integral copy of the application context or provide an incremental update to a previously sent application context.
   b. Until the back-off timer expires, the network may remain idle, in that the network, for example in form of the AS, may refrain from sending updates, even if the application context changes. Once the back-off timer expires, the network may, of the application context has changed, send an update to the UE via another context retrieval message 314 and may start the back-off timer again. This way, it may be ensured that the context retrieval messages are not sent too frequently, which may otherwise overload the client device and/or the network. Steps a. and b. may be repeated, for example until the UE disconnects from the network.
   c. Due to changes in UE and/or in network conditions (e.g., the UE moving out of coverage, there being service requirements change), the UE may disconnect from the network using the disconnect procedure 330 and uses the application context from the last retrieval response from the network to redeploy the application service to the next network the UE may subsequently connect to. Such redeployment may for example comprise (a) the UE sending the last application context and instructing the AS to download the application from an external repository if connectivity to the external repository exists, (b) or if connectivity to the external repository does not exist, the UE uploading the application and the last application context and instructing the AS to deploy the application.

Procedure C: Just-In Time Context Retrieval

Figure 6D:
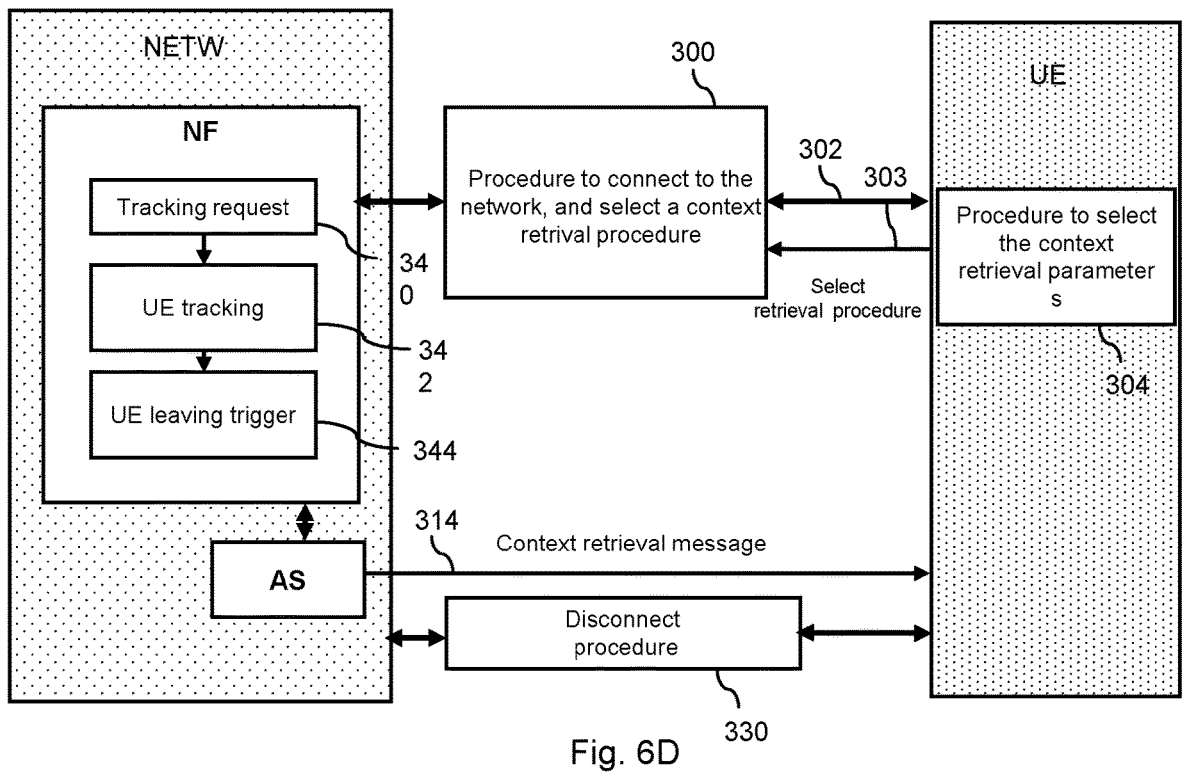

FIG. 6D shows a context retrieval procedure according to a just-in-time-retrieval model. The procedure may be performed in phase I and may comprise:

1. The UE and the network may follow the procedure 300 to have the UE connect to the network and select a context retrieval procedure. Based on a message exchange 302 between the UE and the network, the UE may select just-in-time retrieval and may inform the network of the selected procedure using a message 303.
2. The selection of just-in-time retrieval may prompt a network function NF in the network, e.g., via a tracking request 340, to start tracking 342 the UE's movements. The NF may track the UE's movements and correlate the movements with an internal coverage map to attempt to make sure that the UE will not go out of coverage before retrieving the application context. The network function NF may for example a combination of the AMF and NWDAF (Network Data Analytics Function).
3. The NF, upon determining that the UE is moving out of coverage, may issue a 'UE leaving trigger' 344.
4. In response to the 'UE leaving trigger', the NF may check to which application service(s) the UE is subscribed to.
5. The NF may subsequently retrieve the application context for each of the application services the UE is subscribed for, and may forward the application context to the UE using a context retrieval message 314. Alternatively, as is shown in FIG. 6D, the NF may request the AS to forward the application context.
6. The UE may disconnect from the network since the UE may be likely to go out of the coverage of the network, e.g., using a disconnect procedure 330. Meanwhile, the NF may refrain from sending application context updates to the UE.
7. The UE may search for a new network, and, upon finding the new network, the UE may use the application context provided by the NF from the previous network to redeploy the application service to the new network.

In general, when a UE supports several application context retrieval procedures, the UE may assign or have assigned priorities to each procedure, for example expressing a preference for a certain procedure over another. For example, the UE's list of priorities may express that procedure C may be preferred (e.g., as it may use the least traffic), then B and ultimately A. In this example, the UE may ask the network if the network supports procedure C. If not, the UE may proceed to ask if the network supports procedure B, and ultimately, if the network supports procedure A.

The network may also choose to use multiple procedures (e.g., the aforementioned procedures A, B, C) simultaneously. For example, the periodical context retrieval procedure A may be used throughout the connection to the network, and the just-in-time context retrieval procedure may be used just before disconnecting. The selection of the procedure may also dynamically change. For example, the UE and/or network may decide to change retrieval procedure depending on current preference or conditions or use multiple retrieval procedures (e.g., A, B and C).

In general, the application context may be maintained by a separate entity outside of the application server. For example, such a separate entity may be a Context Repository Function (CRF). This function may for example be a $3^{rd}$ party function (e.g., an AF) or a new function within the core network and may provide a repository that exposes application contexts that are used in the network. This function may have connectivity towards the AS and UE to retrieve and expose the application context, for example via the same mechanisms as how the UE may directly retrieve the application contexts from the AS as defined in procedures A to C. It is noted that the CRF may be provided by an application context repository server.

Context Retrieval and Send Messages

In general, the network, for example in form of the AS itself or an application context repository in the network or through another network function, may allow the UE to retrieve the application context information, for example using the following message which may be sent by the UE to the respective entity:

GET {service}/context_retrieval HTTP/1.1 Host: 5Gprovider.com

Here, {service} may identify the deployed service by the UE. The network may verify the request from the UE, and if the UE is recognized, reply to the UE, for example with an HTTP message containing an application context to be used to redeploy the application service. In some examples, the network may append a sequence number to each request, which may help the UE to keep track of the last valid application context.

The network, for example in form of the AS itself or an application context repository in the network or through another network function, may also allow the UE to send and thereby deploy the application context information, for example using the following message which may be sent by the UE to the respective entity:

PUT {service}/context HTTP/1.1
Host: UE_IP_address

Figure 7:
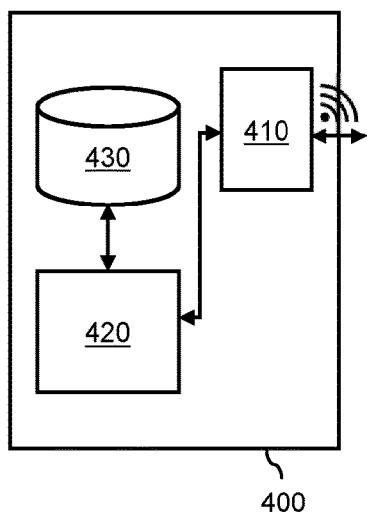
FIG. 7 shows a processor system which may be exemplary for a client device as described in this specification.

FIG. 7 shows a processor system 400 which may be exemplary for the client device or UE described in this specification, and which may in the following be simply referred to as client device 400. The client device 400 may comprise a radio interface 410 for connecting to a mobile network. The radio interface 410 may for example be a 5G or next-gen (6G, etc.) radio interface for connecting to a 5G or next-gen mobile network adhering to one or more 3GPP standards. Although not shown in FIG. 7, the client device 400 may also comprise an antenna or antenna connection for the radio.

The client device 400 may further comprise a processor subsystem 420 which may be configured, e.g., by hardware design or software, to perform the operations described in this specification in as far as pertaining to the client device or UE(s). In general, the processor subsystem 420 may be embodied by a single Central Processing Unit (CPU), such as a x86 or ARM-based CPU, but also by a combination or system of such CPUs and/or other types of processing units, such as Graphics Processing Units (GPUs). The client device 400 is further shown to comprise a data storage 430 which may for example comprise volatile random-access memory or non-volatile solid-state memory, which may be used by the client device 400 to store data, for example to store the local copy of the application context and/or other data.

In general, the client device 400 may be embodied by a (single) device or apparatus, e.g., a smartphone, personal computer, laptop, tablet device, gaming console, set-top box, television, monitor, projector, smart watch, smart glasses, media player, media recorder, etc. In some examples, the client device 400 may act as one or more UEs of a mobile telecommunication network, such as a 5G or next-gen mobile network. In some examples, the client device 400 may be embodied by a (distributed) system of devices, such as a combination of two mobile devices each having a radio.

Figure 8:
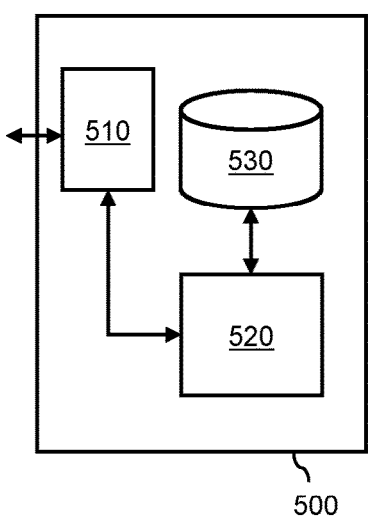
FIG. 8 shows a processor system which may be exemplary for a network node or system of network nodes described in this specification.

FIG. 8 shows a processor system 500 which may represent a network node or system of network nodes as described in this specification. Such network node(s) may for example implement an application server or a context repository server, meaning that the processor system 500 may implement such an application server or such a context repository server. Such network node(s) may also implement any network function described in this specification, e.g., the NF, the AS and/or the CRF. The processor system 500 may comprise a network interface 510 for data communication with a mobile network and with entities associated with the mobile network. The network interface 510 may for example be a wired communication interface, such as an Ethernet or fiber-optic based interface, to a fixed (e.g., non-mobile) part of the mobile network. Alternatively, the network interface 510 may be a wireless communication interface, e.g., being of a type as described for the client device 400 of FIG. 7. In yet other examples, the processor system 500 may be a subsystem of a larger system, e.g., a subsystem of a supra-system implementing several network functions. In such cases, the network interface 510 may be an internal interface of the supra-system, for example a virtual, software-based network interface.

The processor system 500 may further comprise a processor subsystem 520 which may be configured, e.g., by hardware design or software, to perform the operations described in this specification in as far as pertaining to the entity that the processor system is embodying, e.g., the network node or system of network nodes implementing for example the application server or the application context repository server. In general, the processor subsystem 520 may be embodied by a single Central Processing Unit (CPU), such as a x86 or ARM-based CPU, but also by a combination or system of such CPUs and/or other types of processing units. In embodiments where the processor system 500 is distributed over different entities, e.g., over different network nodes or servers, the processor subsystem 520 may also be distributed, e.g., over the CPUs of such different network nodes or servers. As also shown in FIG. 8, the processor system 500 may comprise a data storage 530, such as a hard drive, a solid-state drive, or an array of such hard and/or solid-state drives, etc., which may be used to store data, such as the application context described in this specification.

In general, each entity described in this specification may be embodied as, or in, a device or apparatus. The device or apparatus may comprise one or more (micro)processors which execute appropriate software. The processor(s) of a respective entity may be embodied by one or more of these (micro)processors. Software implementing the functionality of a respective entity may have been downloaded and/or stored in a corresponding memory or memories, e.g., in volatile memory such as RAM or in non-volatile memory such as Flash. Alternatively, the processor(s) of a respective entity may be implemented in the device or apparatus in the form of programmable logic, e.g., as a Field-Programmable Gate Array (FPGA). Any input and/or output interfaces may be implemented by respective interfaces of the device or apparatus. In general, each functional unit of a respective entity may be implemented in the form of a circuit or circuitry. A respective entity may also be implemented in a distributed manner, e.g., involving different devices or apparatus.

Figure 9:
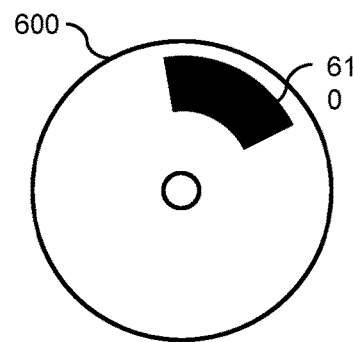
FIG. 9 shows a non-transitory computer-readable medium comprising data.

It is noted that any of the methods described in this specification, for example in any of the claims, may be implemented on a computer as a computer implemented method, as dedicated hardware, or as a combination of both. Instructions for the computer, e.g., executable code, may be stored on a computer-readable medium 600 as for example shown in FIG. 9, e.g., in the form of a series 610 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 9 shows by way of example an optical storage device 600.

Figure 10:
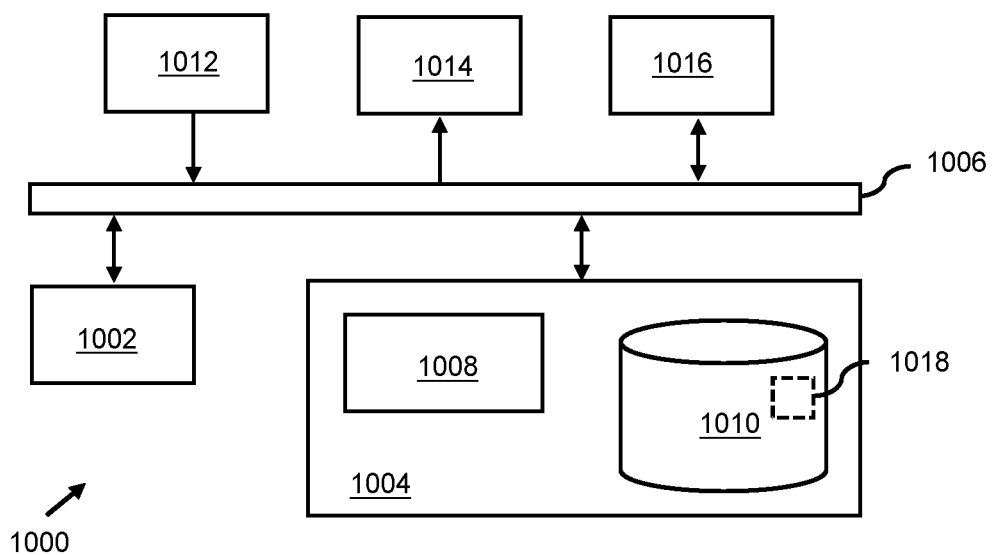
FIG. 10 shows an exemplary data processing system.

FIG. 10 is a block diagram illustrating an exemplary data processing system 1000 that may be used in the embodiments described in this specification. Such data processing systems include data processing entities described in this specification, including but not limited to the client device, UE and any network node or system of network nodes implementing for example an application server or a context repository server. The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Radios, modems, cable modems, and ethernet cards are examples of different types of network adapter that may be used with data processing system 1000.

As shown in FIG. 10, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a client device or UE as described in this specification. In that case, application 1018 may represent an application that, when executed, configures data processing system 1000 to perform the functions described with reference to the client device or UE. In another example, data processing system 1000 may represent an embodiment of a network node or system of network nodes as described in this specification. In that case, application 1018 may represent an application that, when executed, configures data processing system 1000 to perform the functions described with reference to the network node(s).

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A client device for a mobile network, the client device comprising:
a radio interface to connect to a first mobile network;
a data storage to store data;
a processor subsystem configured to utilize an application service provided by a first application server, wherein the first application server is located in a data network connected to the first mobile network;
wherein the processor subsystem is configured to transfer an application context of the application service between different mobile networks by:
when the client device is connected via the radio interface to the first mobile network, retrieving the application context of the application service from the first mobile network and storing the application context as a local copy in the data storage; and
when the client device is connected via the radio interface to a second mobile network, sending the application context to a second application server located in a data network connected to the second mobile network, which second application server is to provide the application service to the client device;
wherein the processor subsystem is configured to retrieve the application context as an integral copy of the application context or as incremental updates containing changes with respect to a previous copy of the application context stored in the data storage.

2. A client device for a mobile network, the client device comprising:
a radio interface to connect to a first mobile network;
a data storage to store data;
a processor subsystem configured to utilize an application service provided by a first application server, wherein the first application server is located in a data network connected to the first mobile network;
wherein the processor subsystem is configured to transfer an application context of the application service between different mobile networks by:
when the client device is connected via the radio interface to the first mobile network, retrieving the application context of the application service from the first mobile network and storing the application context as a local copy in the data storage; and
when the client device is connected via the radio interface to a second mobile network, sending the application context to a second application server located in a data network connected to the second mobile network, which second application server is to provide the application service to the client device;
wherein the processor subsystem is configured to retrieve the application context from the first mobile network using at least one retrieval procedure selected from a group of retrieval procedures, wherein the group of retrieval procedures comprises:
periodically receiving the application context from the first mobile network, for example by periodically requesting the application context from the first mobile network;
subscribing with the first mobile network to periodically receive the application context from the first mobile network; and
receiving the application context from the first mobile network when the client device is estimated to move outside of a coverage area of the first mobile network.

3. The client device according to claim 2, wherein the processor subsystem is configured for at least one of:
exposing to the second mobile network which one or more retrieval procedures from the group of retrieval procedures are supported by the client device; and
retrieving from the second mobile network which one or more retrieval procedures from the group of retrieval procedures are supported by the second mobile network.

4. The client device according to claim 2, wherein the processor subsystem is configured to negotiate with the second mobile network which one or more retrieval procedures from the group of retrieval procedures to use.

5. The client device according to claim 1, wherein the processor subsystem is configured to, if data communication with the second mobile network indicates that the second mobile network does not provide support for the transfer of the application context by the client device and/or that the second mobile network cannot provide the application service, disconnect from the second mobile network.

6. The client device according to claim 1, wherein the processor subsystem is configured to, when the client device is connected via the radio interface to the second mobile network, deploy or trigger deployment of the application service to the second application server.

7. The client device according to claim 6, wherein the processor subsystem is configured to deploy or trigger the deployment of the application service by at least one of:
   uploading an application to the second mobile network to be executed by the second application server, wherein the application is configured to provide the application service;
   requesting the second mobile network to deploy the application service by downloading the application from a repository.

8. A computer-implemented method for use with a client device, wherein the client device is configured to connect to a first mobile network and to utilize an application service provided by a first application server, wherein the first application server is located in a data network connected to the first mobile network,
   wherein the method comprises transferring an application context of the application service between different mobile networks by:
   when the client device is connected to the first mobile network, retrieving the application context of the application service from the first mobile network and storing the application context as a local copy in a data storage of the client device; and when the client device is connected to a second application server located in a data network connected to the second mobile network, which second application server is to provide the application service to the client device; wherein retrieving includes retrieving the application context as an integral copy of the application context or as incremental updates containing changes with respect to a previous copy of the application context stored in the data storage.

9. A transitory or non-transitory computer-readable medium comprising data representing a computer program, the computer program comprising instructions for causing a processor system to perform the method according to claim 8.

10. A computer-implemented method for use with a client device, wherein the client device is configured to connect to a first mobile network and to utilize an application service provided by a first application server, wherein the first application server is located in a data network connected to the first mobile network,
   wherein the method comprises transferring an application context of the application service between different mobile networks by:
   when the client device is connected to the first mobile network, retrieving the application context of the application service from the first mobile network and storing the application context as a local copy in a data storage of the client device; and when the client device is connected to a second application server located in a data network connected to the second mobile network, which second application server is to provide the application service to the client device;
   wherein retrieving includes retrieving the application context from the first mobile network using at least one retrieval procedure selected from a group of retrieval procedures, wherein the group of retrieval procedures comprises:
   periodically receiving the application context from the first mobile network, for example by periodically requesting the application context from the first mobile network;
   subscribing with the first mobile network to periodically receive the application context from the first mobile network; and
   receiving the application context from the first mobile network when the client device is estimated to move outside of a coverage area of the first mobile network.

* * * * *